(12) United States Patent
Difrancesco et al.

(10) Patent No.: US 10,226,737 B2
(45) Date of Patent: Mar. 12, 2019

(54) CATALYST MODULES AND APPLICATIONS THEREOF

(71) Applicant: CORMETECH, INC., Durham, NC (US)

(72) Inventors: Chris Difrancesco, Durham, NC (US); Scot Pritchard, Durham, NC (US); Eric Baker Howell, Durham, NC (US); Jeremy Thomas Freeman, Durham, NC (US)

(73) Assignee: Cormetech, Inc., Durham, NC (US)

( * ) Notice: Subject to any disclaimer, the term of this patent is extended or adjusted under 35 U.S.C. 154(b) by 122 days.

(21) Appl. No.: 15/329,952

(22) PCT Filed: Jul. 29, 2015

(86) PCT No.: PCT/US2015/042713
§ 371 (c)(1),
(2) Date: Jan. 27, 2017

(87) PCT Pub. No.: WO2016/019050
PCT Pub. Date: Feb. 4, 2016

(65) Prior Publication Data

US 2017/0266617 A1 Sep. 21, 2017

Related U.S. Application Data

(60) Provisional application No. 62/030,427, filed on Jul. 29, 2014.

(51) Int. Cl.
*B01D 53/86* (2006.01)
*B01J 19/24* (2006.01)

(52) U.S. Cl.
CPC ...... *B01D 53/8631* (2013.01); *B01J 19/2485* (2013.01); *B01D 2255/92* (2013.01)

(58) Field of Classification Search
None
See application file for complete search history.

(56) References Cited

U.S. PATENT DOCUMENTS 6,096,682 A * 8/2000 Steenackers ............. B01J 35/04
422/180
2007/0189948 A1 8/2007 Rocha et al.
(Continued)

FOREIGN PATENT DOCUMENTS

DE  3505351 A1  8/1986
JP  51112483 A  10/1976
(Continued)

OTHER PUBLICATIONS

International Search Report issued in corresponding International Application No. PCT/US2015/042713, dated Oct. 6, 2015, 9 pages.

*Primary Examiner* — Walter D. Griffin
*Assistant Examiner* — Jelitza M Perez
(74) *Attorney, Agent, or Firm* — J. Clinton Wimbish; Nexsen Pruet, PLLC

(57) ABSTRACT

In one aspect, catalyst modules and catalytic reactors are provided which, in some embodiments, mitigate inefficiencies and/or problems associated with fluid stream pressure drop A catalyst module comprises a layer of structural catalyst bodies arranged in a pleated format, the structural catalyst bodies forming pleat inlet faces and pleat outlet faces, wherein fluid flow channels defined by inner partition walls of the structural catalyst bodies extend from the pleat inlet faces to the pleat outlet faces. The pleat inlet faces form an angle (δ) with an inlet face of the module.

25 Claims, 5 Drawing Sheets

(56) References Cited

U.S. PATENT DOCUMENTS

2008/0072551 A1* 3/2008 Zuberi ............... B01D 39/2082
  55/385.1
2016/0144317 A1* 5/2016 Orehovsky ........... F01N 3/2066
  422/177

FOREIGN PATENT DOCUMENTS

| JP | 53003964 A | 1/1978 | | |
|---|---|---|---|---|
| JP | 56089836 A | 7/1981 | | |
| WO | 2014201485 A1 | 12/2014 | | |
| WO | WO-2014201485 A1 | * | 12/2014 | ........... F01N 3/2066 |

* cited by examiner

CATALYST MODULES AND APPLICATIONS THEREOF

RELATED APPLICATION DATA

The present application is a national stage application under 35 U.S.C. § 371 of International Application No. PCT/US2015/042713, filed Jul. 29, 2015, which claims priority pursuant to 35 U.S.C. § 119(e) to U.S. Provisional Patent Application Ser. No. 62/030,427 filed Jul. 29, 2014, each of which are incorporated herein by reference in their entireties.

FIELD

The present invention relates to catalyst modules and, in particular, to catalyst modules employing structural catalyst bodies in a pleated arrangement.

BACKGROUND

Denitrification or selective catalytic reduction (SCR) technology is commonly applied to combustion-derived flue gases for removal of nitrogen oxides when passed through a catalytic reactor. Denitrification comprises the reaction of nitrogen oxide species in the gases, such as nitrogen oxide (NO) or nitrogen dioxide ($NO_2$), with a nitrogen containing reductant, such as ammonia or urea, resulting in the production of diatomic nitrogen ($N_2$) and water. Moreover, various absorbent or capture technologies are used to remove other chemical species of a flue gas that are not catalytically decomposed.

The terminology catalytic reactor is generally used to describe a vessel comprising catalyst. Catalytic reactors generally comprise catalyst structures containing exhaust gas flow paths that enable contact between exhaust gas streams and catalytically active components of the catalyst structure. The catalyst structure of a modular catalytic reactor is typically composed of a large number of modularized sections. Each modularized section comprises a metal support framework which holds a number of catalyst bodies in place wherein sealing or packing materials between the catalyst bodies are used, if necessary, for proper flow distribution of exhaust streams passing through the catalyst bodies. The catalyst bodies contain the catalytic composition and display a physical structure that delineates flow channels or passageways for exhaust gas flow through the catalyst bodies.

In many cases, exhaust gas streams flowing through modularized sections of a catalytic reactor experience pressure drop. Pressure drop can result from structures, frictional forces and other factors impeding or resisting the flow of the exhaust gas stream. Pressure drop can result in various inefficiencies and cause parasitic power losses during industrial applications such as electrical power generation.

SUMMARY

In one aspect, catalyst modules and catalytic reactors are provided which, in some embodiments, mitigate inefficiencies and/or problems associated with fluid stream pressure drop. For example, catalyst modules and/or catalytic reactors described herein can provide decreases in pressure drop without reducing or substantially reducing catalytic performance in the selective reduction of nitrogen oxides and/or other catalytic reactions. A catalyst module comprises a layer of structural catalyst bodies arranged in a pleated format, the structural catalyst bodies forming pleat inlet faces and pleat outlet faces, wherein fluid flow channels defined by inner partition walls of the structural catalyst bodies extend from the pleat inlet faces to the pleat outlet faces. The pleat inlet faces form an angle (δ) with an inlet face of the module. In some embodiments, the angle (δ) ranges from about 5 degrees to about 85 degrees.

Moreover, a catalytic reactor described herein comprises at least one module including a layer of structural catalyst bodies arranged in a pleated format. The structural catalyst bodies form pleat inlet faces and pleat outlet faces, wherein fluid flow channels defined by inner partition walls of the structural catalyst bodies extend from the pleat inlet faces to the pleat outlet faces. The pleat inlet faces form an angle (δ) with an inlet face of the module. In some embodiments, the angle (δ) ranges from about 5 degrees to about 85 degrees.

These and other embodiments are described in further detail in the detailed description which follows.

DETAILED DESCRIPTION

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

I. Catalyst Modules

A catalyst module described herein comprises a layer of structural catalyst bodies arranged in a pleated format, the structural catalyst bodies forming pleat inlet faces and pleat outlet faces, wherein fluid flow channels defined by inner partition walls of the structural catalyst bodies extend from the pleat inlet faces to the pleat outlet faces. The pleat inlet faces form an angle (δ) with an inlet face of the module. δ can be selected to have any value not inconsistent with the objectives of the present invention. In some embodiments, δ is selected from values presented in Table I.

TABLE I

| Values for δ (degrees) |
| --- |
| 5-87 |
| 55-87 |
| 60-85 |
| 70-80 |

Figure 1:
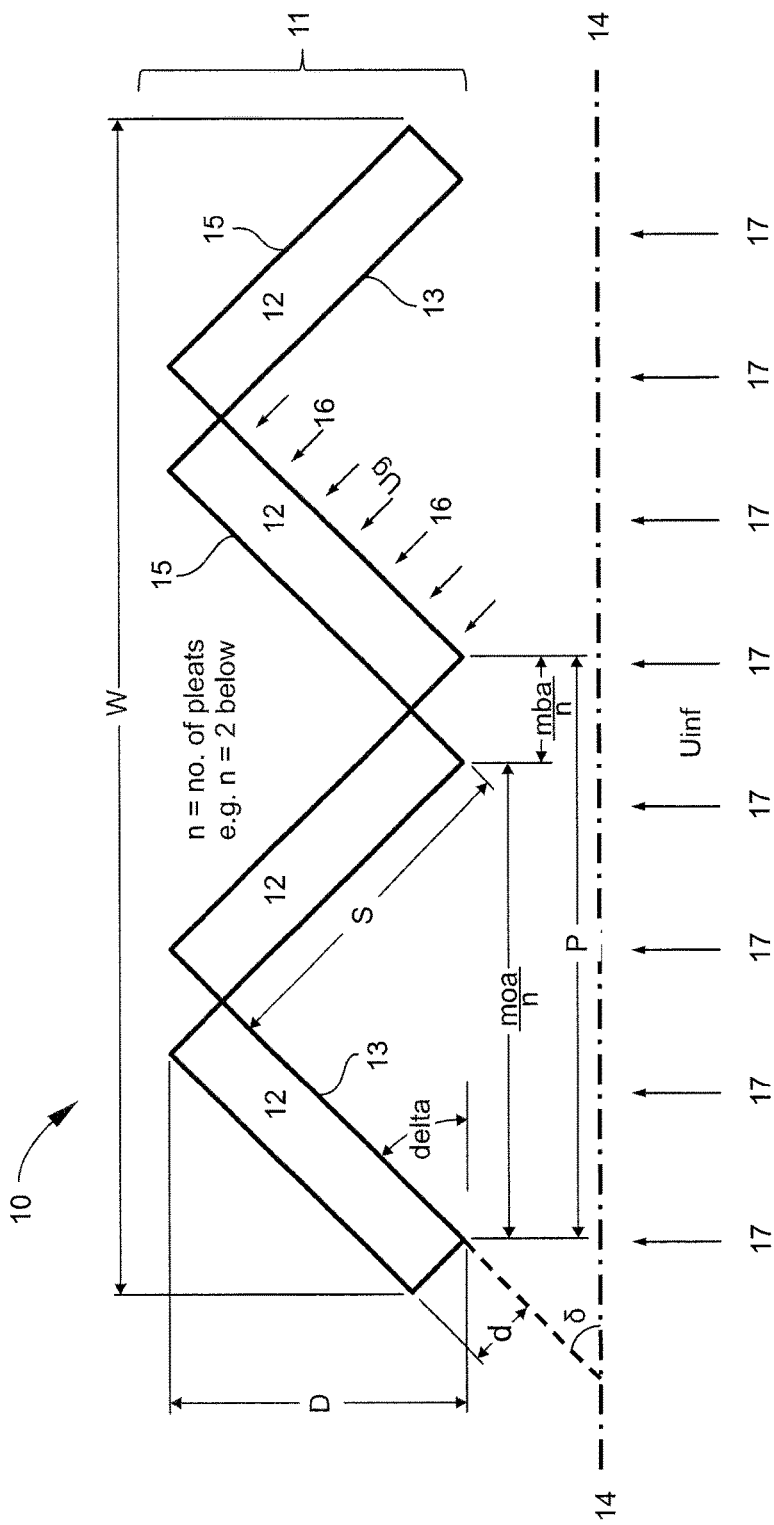
FIG. 1 illustrates a pleated arrangement of structural catalyst bodies of a module according to one embodiment described herein.
Figure 5:
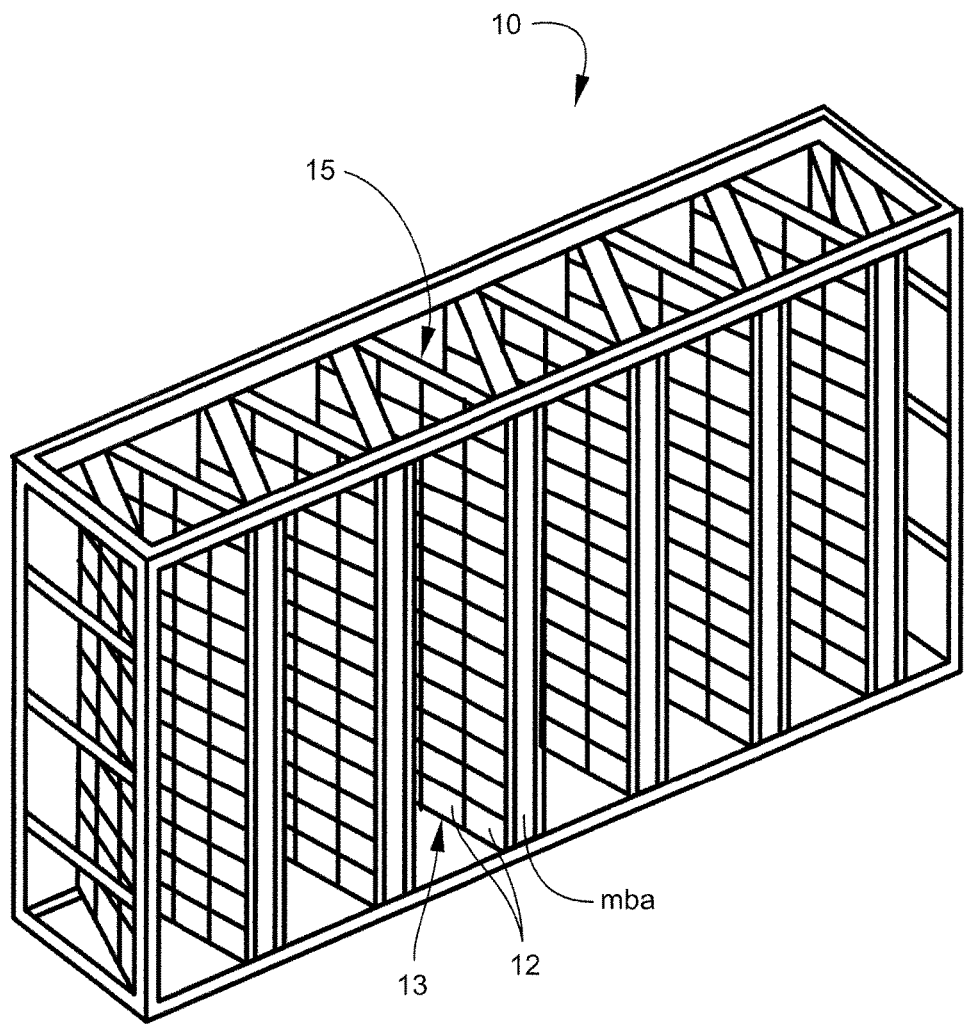
FIG. 5 illustrates a perspective view of a pleated arrangement of structural catalyst bodies of a module according to one embodiment described herein.

Referring now to FIG. 1, a two pleat section of a pleated catalyst layer formed of structural catalyst bodies is illustrated. The structural catalyst bodies can be arranged to provide any number of pleats not inconsistent with the objectives of the present invention. In forming the pleated format, the structural catalyst bodies (12) provide pleat inlet faces (13) forming an angle (δ) with an inlet face (14) of the module (10). Individual pleat inlet faces (13) formed by the structural catalyst bodies (12) have a width, s, and provide a module open area (moa) for passing fluid through the catalyst layer (11). Arrows (16) in FIG. 1 illustrate fluid flow through pleat inlet faces (13) formed by the catalyst bodies (12). As the pleat inlet faces (13) are arranged at angle (δ) from the inlet face (14) of the catalyst module (10), the fluid stream (16) must turn from the module inlet direction (17) for passage through the structural catalyst bodies (12). As described herein, fluid passes through the structural catalyst bodies (12) via flow channels defined by inner partition walls extending from the pleat inlet face (13) to the pleat outlet face (15). In some embodiments, structural catalyst bodies (12) forming pleat inlet (13) and outlet (15) faces are bonded to one another with cement or adhesive forming a monolithic honeycomb structure. Alternatively, structural catalyst bodies (12) forming pleat inlet (13) and outlet (15) faces are separated from one another by packing material. FIG. 5 illustrates a perspective view of a pleated arrangement of structural catalyst bodies of a module according to one embodiment described herein. As illustrated in FIG. 5, pleat inlet (13) and outlet faces (15) are formed of individual honeycomb structural catalyst bodies (12).

The catalyst module (10) can have any percent open area not inconsistent with the objectives of the present invention. For example, in some embodiments, the catalyst module (10) has a percent open area selected from Table II.

TABLE II

| Catalyst Module Percent Open Area |
| --- |
| 5-99 |
| 20-95 |
| 60-95 |
| 50-85 |
| 45-75 |

With reference to FIG. 1, percent open area of a catalyst module is defined as $$\left(\frac{moa}{W}\right)100.$$

Moreover, ends of the structural catalyst bodies (12) have a depth, d, extending between the inlet (13) and outlet (15) faces. Depth, d, defines a module blocked area (mba) where the passage of fluid is blocked. Fluid entering mba regions is redirected to pleat inlet faces (13) and flowed through the structural catalyst bodies (12). The pleated arrangement of structural catalyst bodies (12) also has a depth, D, and a pleat width, P, where overall width of the module is W.

With the foregoing parameters assigned, the catalyst module, in some embodiments, satisfies the condition of Equation (1):

$$\frac{W}{2ns} \leq 1,$$

wherein W is module width, n is the number of pleats and s is the width of a pleat inlet face as provided in FIG. 1. In some embodiments, $$\frac{W}{2ns}$$

has a value selected from Table III.

TABLE III

| Value of $\frac{W}{2ns}$ |
| --- |
| 0.001-0.99 |
| 0.01-0.95 |
| 0.1-0.9 |
| 0.3-0.8 |

Generally, catalyst body pressure drop ($\Delta p_c$) exhibits direct proportionality with $$\frac{W}{2ns}.$$

However, secondary pressure losses ($\Delta p_m$) resulting from the pleated arrangement must be considered in final design of the catalyst module. Secondary pressure losses can result primarily from contraction in flow area from the freestream in the duct to the open area of the module and expansion from the module back into the freestream of the duct. Additional secondary losses can be associated with the required turn of the fluid stream into the catalyst body facial inlet planes and out of the catalyst body exit. Secondary pressure losses can be managed by choosing appropriate pleating geometry including δ, n and s. Module depth, $D_m$, must also be considered and be within practical limits for a given fluid stream treatment application.

Further, the catalyst module can exhibit a ratio of d/s ranging from 0.001 to 0.5. In some embodiments, the d/s ratio ranges from 0.003 to 0.3. By satisfying one or more of the foregoing conditions, it has been found that catalyst layers having a pleated arrangement of structural catalyst bodies can reduce pressure drop through the module without sacrificing catalytic performance and/or requiring significant structural modification to the module to maintain catalytic performance.

Figure 2:
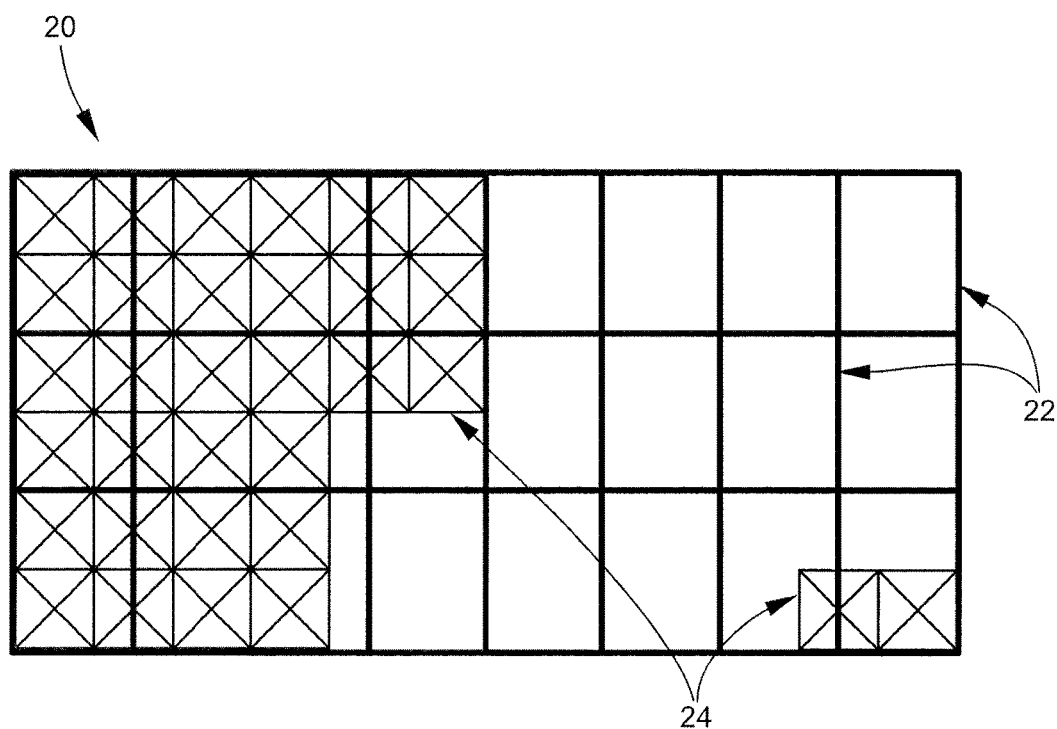
FIG. 2 illustrates a prior arrangement of structural catalyst bodies in a module.

The pleated arrangement of structural catalyst bodies is in sharp contrast to traditional arrangement of catalyst bodies in a module. FIG. 2 illustrates a traditional arrangement of structural catalyst bodies (24) in a module (20). FIG. 2 illustrates a plan view of an inlet side of a prior catalyst module (20). The catalyst module (20) comprises an open metal framework (22) for supporting structural catalyst bodies (24) disposed therein. The structural catalyst bodies (24) are arranged side-by-side with the inlet faces of the catalyst bodies normal to the direction of gas flow. In being normal to the direction of gas flow, inlet faces of the catalyst bodies (24) are parallel with the module (20) inlet face, resulting in an angle of 0 degrees between module and catalyst body inlet faces. The catalyst module (20) provided in FIG. 2 is only partially filled with catalyst bodies (24) to illustrate the open nature of the framework (22). Packing materials are provided between the catalyst bodies (24) to prevent fluid stream flow from bypassing the catalyst bodies (24). The effective catalytic cross-sectional area of the module illustrated in FIG. 2 does not exceed the cross-sectional area of the module framework (22).

Figure 3:
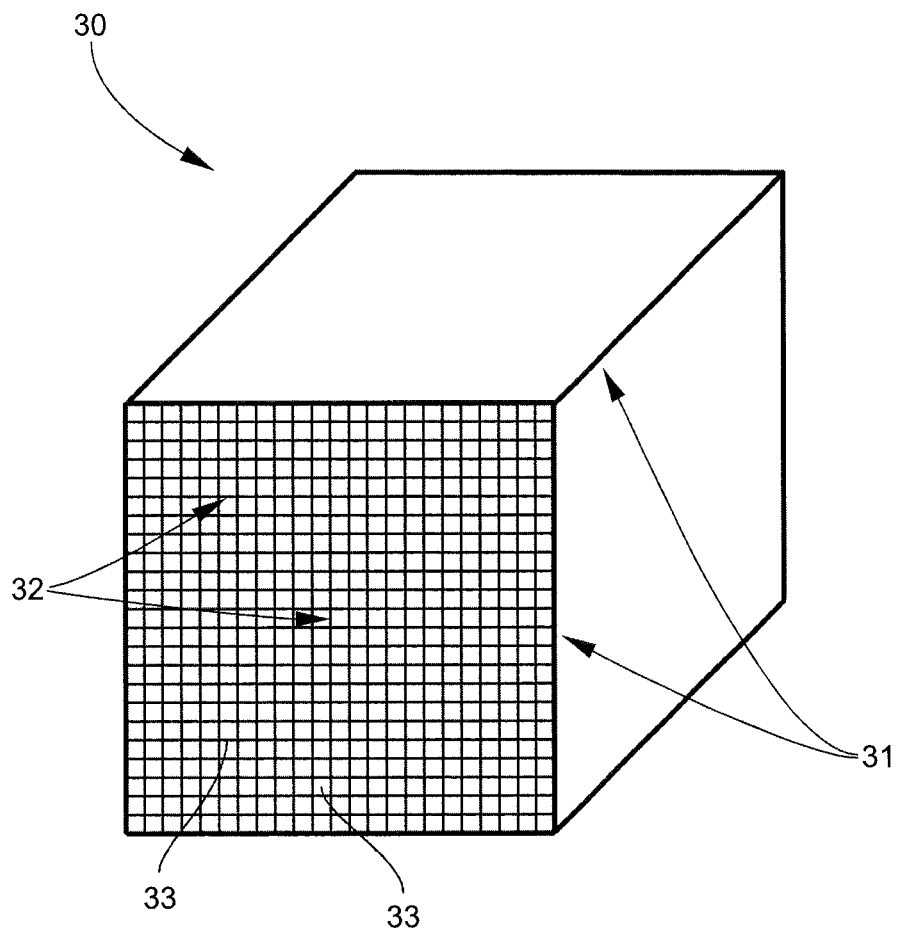
FIG. 3 illustrates a honeycomb-like structural catalyst body according to one embodiment described herein.

Structural catalyst bodies for use in pleated layers described herein comprise a fluid stream inlet face, a fluid stream outlet face and flow channels defined by inner partition walls extending from the inlet face to the outlet face. Structural catalyst bodies can exhibit various flow channel constructions. For example, a structural catalyst body can have a honeycomb design comprising an outer peripheral wall and a plurality of inner partition walls arranged within the outer peripheral wall. FIG. 3 illustrates a honeycomb-like structural catalyst body according to one embodiment described herein. The structural catalyst body (30) of FIG. 3 comprises an outer peripheral wall (31) and a plurality of inner partition walls (32). The inner partition walls (32) define a plurality of flow channels or cells (33) which extend longitudinally through the honeycomb-like structural catalyst body (30). The inner partition walls (32) and their junctures with the outer peripheral wall (31) serve as boundaries of adjacent flow channels (33). As the cross-sectional profile of flow channels (33) of the honeycomb-like structural catalyst body illustrated in FIG. 3 is square, the inner partition walls (32) have equal or substantially equal widths.

Cross-sectional profiles of flow channels can also be nominally polygonal such as triangular, square, rectangular or hexagonal. In some embodiments, cross-sectional profiles of flow channels can be round or oval or combinations with polygonal and curved shapes such as annular sectors. Moreover, the cross-sectional profile of the outer perimeter of the outer peripheral wall of the catalytic body can be square, rectangular, round, oval, circular sectors such as pie slices or quadrants, or any other geometric shape or shapes convenient for a given application.

Figure 4:
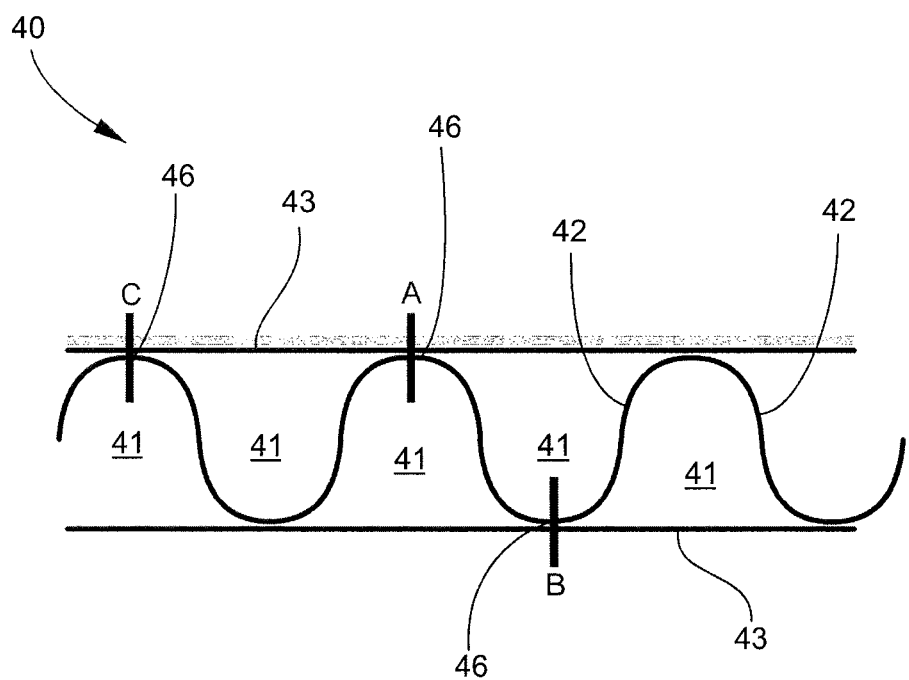
FIG. 4 illustrates a cross-section of a portion of a corrugated structural catalyst body according to one embodiment described herein.

Further, corrugated structural catalyst bodies can be employed in pleated arrangements described herein. FIG. 4 illustrates a cross-section of a portion of a corrugated structural catalyst body according to one embodiment described herein. The flow channels (41) of the structural catalyst body (40) are defined by inner partition walls (42, 43). The inner partition walls (42, 43) and their junctures or intersections with one another serve as boundaries for adjacent flow channels (41). As illustrated in FIG. 4, the corrugated catalyst body (40) comprises flat inner partition walls (43) having a width as defined by the distance between A and C. The corrugated catalyst body also has curved inner partition walls (42) having a width defined by the distance between A and B. Moreover, intersection of inner partition walls (42, 43) with one another at points A, B and C, for example, provide centerpost structures (46).

Structural catalyst bodies arranged in pleated format described herein can have any desired cell density or flow channel density. Structural catalyst bodies, for example, can have a cell density in the range of 50 cells per square inch (cpsi) to 900 cpsi. Additionally, structural catalyst bodies can be formed of any desired composition. Composition of the structural catalyst bodies can be chosen according to several factors including catalytic reaction(s) of interest, catalytic surface area and size requirements of the structural catalyst body. Structural catalyst bodies can exhibit single-functional or multi-functional catalytic activity.

In some embodiments, the structural catalyst bodies are suitable for the selective catalytic reduction of nitrogen oxides. In such embodiments, the catalyst bodies can be formed of a chemical composition comprising 50-99.9% by weight an inorganic oxide composition and at least 0.1% by weight a catalytically active metal functional group. The inorganic oxide composition can include, but is not limited to, titania ($TiO_2$), alumina ($Al_2O_3$), zirconia ($ZrO_2$), and/or mixtures thereof. Moreover, in some embodiments, the catalytically active metal functional group includes, but is not limited to, gold, platinum, iridium, palladium osmium, rhodium, rhenium, ruthenium, vanadium pentoxide ($V_2O_5$), tungsten oxide ($WO_3$), molybdenum oxide ($MoO_3$) or other noble metals or mixtures thereof. In further embodiments, the chemical composition can comprise up to 30% by weight other oxides such as silicon dioxide ($SiO_2$), reinforcement agents such as glass fibers and/or extrusion aids. Further, the chemical composition can be substantially uniform.

In some embodiments, structural catalyst bodies for use in modules described herein have a construction as described in any one of U.S. Pat. Nos. 7,776,786, 7,807,110, 7,833,932 and 7,390,471, each of which is incorporated herein by reference in its entirety. Additionally, a structural catalyst body can have a construction as described in United States Patent Application Publication 2012/0087835, which is incorporated herein by reference in its entirety.

Catalyst modules, pleated catalyst layers and associated structural catalyst bodies, in some embodiments, have design and dimensions suitable for use in industrial fluid treatment applications, including the selective catalytic reduction of nitrogen oxides generated from large stationary combustions sources, such as electric power generation plants. Catalyst modules described herein can find application in HRSG or gas turbine exhaust gas treatment systems.

II. Catalytic Reactors

In another aspect, catalytic reactors are provided. A catalytic reactor described herein comprises at least one module including a layer of structural catalyst bodies arranged in a pleated format. The structural catalyst bodies form pleat inlet faces and pleat outlet faces, wherein fluid flow channels defined by inner partition walls of the structural catalyst bodies extend from the pleat inlet faces to the pleat outlet faces. The pleat inlet faces form an angle (δ) with an inlet face of the module. In some embodiments, a catalytic reactor comprises a plurality of modules including a layer of structural catalyst bodies arranged in a pleated format. The pleated format and associated structural catalyst bodies can have any properties, construction and/or design recited in Section I hereinabove. In some embodiments, modules of a catalytic reactor employ catalyst layers of different pleating format. Pleating format of the structural catalyst bodies, for example, can be tailored to the fluid stream flow conditions specific to the location or position of the module in the catalytic reactor.

Catalytic reactors employing modules including layers of structural catalyst bodies arranged in a pleated format, in some embodiments, satisfy the relationship of Equation (2):

$$x = \frac{dp}{P} \bigg/ u_{inf}^2$$

wherein x is 0.001-0.1 and dp is the difference in static pressure (in-$H_2O$) across the catalytic reactor, as measured in the field;

P is the catalyst potential, where $P=-\ln(1-deNO_x)/\text{margin}$, wherein $deNO_x$ is the $NO_x$ removal efficiency of the catalytic reactor and margin is conventional performance margin (increase in potential) applied for deactivation and other full-scale system factors. For SCR reactors, $deNO_x$ generally ranges from 40-98% and margin is generally assigned a value of 0.25-0.95; and $u_{inf}$ is the average freestream velocity immediately upstream of the catalytic reactor. The average freestream velocity can be obtained by taking measurements at various locations across the inlet face of the catalytic reactor. Generally, the average freestream velocity ranges from 0.1 m/s to 30 m/s.

In some embodiments, x<0.01. Satisfaction of the foregoing relationship enables the catalytic reactor to achieve desirable pressure drop values while maintaining high catalyst potential and catalytic activity without substantial increases in module depth. Therefore, pleated arrangements of structural catalyst bodies described herein can be applied to existing module and catalytic reactor constructions. Several parameters can be varied enabling the catalytic reactor to satisfy Equation (2). These parameters include the number of pleats formed by arrangement of the structural catalyst bodies, the pleat angle, module depth ($D_m$) and module open area (moa). Moreover, acceptable ranges of x for Equation 2 can vary according to cpsi of the structural catalyst bodies arranged in the pleated format. For example, Table IV provides values for parameters of Equation 2 and resulting ranges for x relative to several cpsi values of catalyst bodies arranged in the pleated format.

TABLE IV

Variance of x relative to cpsi

| Structural Catalyst Body cpsi | dp (in-H$_2$O) | P | $u_{inf}$ (m/s) | Range of x Satisfying Eq. 2 |
|---|---|---|---|---|
| 325 | 0.1-3.9 | 0.5-8.75 | 0.5-12 | 0.002-0.05 |
| 160 | 0.38-3.2 | 0.5-8 | 0.5-12 | 0.003-0.06 |
| 140 | 0.4-3.9 | 0.5-7.9 | 0.5-12 | 0.003-0.06 |
| 100 | 0.5-5.4 | 0.5-7.8 | 0.5-10 | 0.004-0.065 |
| 85 | 0.7-8.9 | 0.5-7.8 | 0.5-9 | 0.005-0.1 | cpsi values of Table IV are employed as non-limiting examples as catalyst body cpsi can also be less than 85 or greater than 900.

Catalytic reactors employing modules including layers of structural catalyst bodies arranged in a pleated format, in some embodiments, satisfy the relationship of Equation (3):

$$y = \frac{(dp \times AV)}{u_{inf}^2}$$

wherein y is less than 0.72, and the structural catalyst bodies have greater than 200 cpsi where dp is the difference in static pressure (in-H$_2$O) across the catalytic reactor, as measured in the field;

$$AV = \frac{V_{dot}}{V} / AP,$$

where $V_{dot}$ is the volumetric flow rate of flue gas in units of Nm$^3$/hr (cubic meters per hour corrected to 0° C.), V is catalyst volume of the catalytic reactor in cubic meters, and AP is the whetted surface area per unit volume (m$^2$/m$^3$); and $u_{inf}$ is the average freestream velocity immediately upstream of the catalytic reactor. In some embodiments, y has a value selected from Table V.

TABLE V

Value for y of Eq. 3

<0.71
<0.7
<0.65
<0.6

Catalytic reactors described herein can be employed in a variety of fluid stream treatment applications. In some embodiments, catalytic reactors find application in the selective catalytic reduction of nitrogen oxides in an exhaust or flue gas stream. The exhaust gas or flue gas stream can be produced from industrial stationary combustion sources, including electrical power generation plants and/or the apparatus for the combustion of hydrocarbons in manufacturing processes. For example, an exhaust gas or flue gas stream is provided to catalytic reactors and modules described herein at a flow rate ranging from 250 lbs/hour to 10,000,000 lbs/hour. In some embodiments, an exhaust gas or flue gas stream is provided to catalyst modules and catalytic reactors described herein at a flow rate selected from Table VI.

TABLE VI

Exhaust Gas Stream Flow Rate to Catalyst Reactor and Modules
Exhaust Gas Stream Flow Rate (lbs/hr)

≥9,000
≥50,000
≥100,000
≥500,000
≥900,000
50,000-5,000,000
1,000-1,000,000

Further, catalytic reactors and associated modules and pleated layers of structural catalyst bodies can find application in the treatment of exhaust gas streams generated by mobile sources, including medium duty diesel (MDD) and heavy duty diesel (HDD) sources. For example, catalytic reactors and modules described herein can find application in treating exhaust gas streams of on-road, off-road, marine and locomotive MDD and HDD sources.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A catalyst module comprising:
  a layer of structural catalyst bodies arranged in a pleated format, the structural catalyst bodies forming pleat inlet faces and pleat outlet faces, wherein fluid flow channels defined by inner partition walls of the structural catalyst bodies extend from the pleat inlet faces to the pleat outlet faces and the pleat inlet faces form an angle (δ) with an inlet face of the module ranging from 5 degrees to 85 degrees and the layer has a percent open area ranging from 20 to 99.

2. The catalyst module of claim 1, wherein the layer has a percent open area ranging from 50 to 85.

3. The catalyst module of claim 1, wherein the module satisfies the condition:

$$\frac{W}{2\,ns} \leq 1$$

wherein W is width of the module, n is pleat number of the module, and s is width of the pleat inlet face.

4. The catalyst module of claim 1, wherein the structural catalyst bodies have a depth (d) extending between the fluid stream inlet and outlet faces and a pleat inlet face width (s) where a ratio of d/s ranges from 0.001 to 0.5.

5. The catalyst module of claim 4, wherein the ratio d/s ranges from 0.003 to 0.3.

6. The catalyst module of claim 1, wherein δ ranges from 55 degrees to 87 degrees.

7. The catalyst module of claim 1, wherein the structural catalyst bodies have a cell density of 50 cells per square inch (cpsi) to 900 cpsi.

8. The catalyst module of claim 1, wherein the structural catalyst bodies are honeycomb catalyst bodies.

9. The catalyst module of claim 1, wherein the structural catalyst bodies are corrugated catalyst bodies.

10. The catalyst module of claim 1, wherein the structural catalyst bodies are operable for the selective catalytic reduction of nitrogen oxides in the fluid stream.

11. A catalytic reactor comprising:
at least one module including a layer of structural catalyst bodies arranged in a pleated format, the structural catalyst bodies forming pleat inlet faces and pleat outlet faces, wherein fluid flow channels defined by inner partition walls of the structural catalyst bodies extend from the pleat inlet faces to the pleat outlet faces, and the pleat inlet faces form an angle (δ) with an inlet face of the module ranging from 5 degrees to 85 degrees and the layer has a percent open area ranging from 50 to 85.

12. The catalytic reactor of claim 11, wherein the catalytic reactor satisfies the relation:

$$x = \frac{dp}{P} \Big/ u_{inf}^2$$

wherein x is 0.001-0.1; dp is the difference in static pressure (in-$H_2O$) across the catalytic reactor, as measured in the field; P is the catalyst potential, where P=−ln(1−deNO$_x$)/margin, wherein deNO$_x$ is the NO$_x$ removal efficiency of the catalytic reactor and margin is conventional performance margin applied for deactivation and full-scale system factors; and $u_{inf}$ is the average freestream velocity immediately upstream of the catalytic reactor.

13. The catalytic reactor of claim 12, wherein the deNO$_x$ is 40-98% and the margin is 0.25-0.95.

14. The catalytic reactor of claim 12, wherein x ranges from 0.001 to 0.009.

15. The catalytic reactor of claim 12, wherein x ranges from 0.002 to 0.06.

16. The catalytic reactor of claim 15, wherein the structural catalyst bodies have a cell density of at least 70 cells per square inch.

17. The catalytic reactor of claim 15, wherein the structural catalyst bodies have a cell density of 75-325 cells per square inch.

18. The catalytic reactor of claim 11, wherein the catalytic reactor satisfies the relation:

$$y = \frac{(dp \times AV)}{u_{inf}^2}$$

wherein y is less than 0.72 and the structural catalyst bodies have greater than 200 cpsi where dp is the difference in static pressure (in-$H_2O$) across the catalytic reactor, as measured in the field;

$$AV = \frac{V_{dot}}{V} \Big/ AP,$$

where $V_{dot}$ is the volumetric flow rate of flue gas in units of Nm$^3$/hr; V is catalyst volume of the catalytic reactor in cubic meters, and AP is the whetted surface area per unit volume; and $u_{inf}$ is the average freestream velocity immediately upstream of the catalytic reactor.

19. The catalytic reactor of claim 18, wherein y is less than 0.6.

20. The catalytic reactor of claim 11, wherein the module satisfies the condition:

$$\frac{W}{2ns} \leq 1.$$

wherein W is the module width, n is the number of pleats and the pleat inlet face is of widths.

21. The catalytic reactor of claim 20, wherein the structural catalyst bodies have a depth (d) extending between the fluid stream inlet and outlet faces, and a ratio d/s ranges from 0.005 to 0.05.

22. The catalytic reactor of claim 11, wherein the catalytic reactor is operable for the selective catalytic reduction of nitrogen oxides in the fluid stream.

23. The catalytic reactor of claim 22, wherein the fluid stream is provided by a stationary combustion source.

24. The catalytic reactor of claim 23, wherein the stationary combustion source is a power plant.

25. The catalytic reactor of claim 23, wherein the fluid stream has a flow rate of 250 lbs/hr to 10,000,000 lbs/hr.

* * * * *